(12) United States Patent
Stanley et al.

(10) Patent No.: US 7,738,260 B2
(45) Date of Patent: Jun. 15, 2010

(54) GROUNDING CONNECTOR FOR AN ELECTRONIC DEVICE

(75) Inventors: Craig Stanley, Libertyville, IL (US); Adam Cole, Gurnee, IL (US); David Lim, Vernon Hills, IL (US); Oleg Los, Buffalo Grove, IL (US)

(73) Assignee: Motorola, Inc, Schaumburg, IL (US)

( * ) Notice: Subject to any disclaimer, the term of this patent is extended or adjusted under 35 U.S.C. 154(b) by 58 days.

(21) Appl. No.: 12/287,084

(22) Filed: Oct. 6, 2008

(65) Prior Publication Data

US 2010/0085688 A1    Apr. 8, 2010

(51) Int. Cl.
*H05K 7/14* (2006.01)
(52) U.S. Cl. ............... 361/799; 361/679.01; 455/575.4; 379/433.11; 439/92; 439/95
(58) Field of Classification Search ............. 361/799, 361/679.01; 379/433.11; 455/575.4; 439/95, 439/92
See application file for complete search history.

(56) References Cited

U.S. PATENT DOCUMENTS

| | | | | |
|---|---|---|---|---|
| 4,897,873 A | | 1/1990 | Beutler et al. ............... 379/433 |
| 5,185,790 A | * | 2/1993 | Mischneko ............ 379/433.13 |
| 5,596,487 A | * | 1/1997 | Castaneda et al. ............ 361/814 |
| 5,598,917 A | | 2/1997 | Thomas ...................... 200/548 |
| 6,524,122 B1 | | 2/2003 | Johnson et al. .............. 439/131 |
| 7,066,765 B2 | * | 6/2006 | Togami et al. ......... 439/607.24 |
| 7,433,467 B2 | * | 10/2008 | Yi .......................... 379/433.13 |

\* cited by examiner

*Primary Examiner*—Jayprakash N Gandhi
*Assistant Examiner*—Ingrid Wright
(74) *Attorney, Agent, or Firm*—The Watson I.P. Group, PLC; Jovan N. Jovanovic; Vladan M. Vasiljevic (57) ABSTRACT

A grounding connector for an electronic device having a first housing element and a second housing element comprising a ground clip, a cam surface and a follower. The ground clip is electrically coupled to a first housing element, and selectably electrically coupled with the second housing element. A cam surface is positioned on the first housing element and in proximity to the ground clip. The follower is slidably positionable on the second housing element, and has a first end that engages the cam surface and a second end that engages the ground clip. The ground clip is electrically coupled to a second housing element while the electronic device is in each of the collapsed orientation and the articulated orientation. Upon movement between the collapsed orientation and the articulated orientation, the cam surface directs the follower to electrically decouple the ground clip from the second housing element.

20 Claims, 5 Drawing Sheets

GROUNDING CONNECTOR FOR AN ELECTRONIC DEVICE

BACKGROUND OF THE DISCLOSURE

1. Field of the Disclosure

The disclosure relates in general to electronic devices, and more particularly, to a grounding connector for an electronic device. The disclosure is well suited for application to a mobile telephone which includes a first and second housing element, although the disclosure is not limited in scope thereto.

2. Background Art

For electronic devices that have multiple housing elements, such as two housing elements which move relative to each other, it is difficult to create a good ground between the two housing elements. Generally a coaxial cable or flex cable is not direct or optimal for providing a good ground between the two housing elements. It is desirable to create a direct connection between the two housing elements for Desense, ESD and RF reasons, among others.

The difficulty of providing a direct connection is that during movement of the housing elements relative to each other, it is advantageous to disconnect the grounding contact, as rubbing contact while the components are moving relative to each other causes noticeable drag and undesirable wear to the plating on the grounding contact.

It is an object of the present invention to provide a direct ground connector which remains connected when the electronic device is in a collapsed orientation and an articulated orientation, but wherein the connection is precluded during relative movement of the housing elements.

It is another object of the present invention to provide a good ground connector when the electronic device is in a collapsed orientation and an articulated configuration while minimizing wear of the contact surfaces of the ground connector.

These objects as well as other objects of the present invention will become apparent in light of the present specification, claims, and drawings.

SUMMARY OF THE DISCLOSURE

The disclosure is directed to a grounding connector for an electronic device. The electronic device has a first housing and a second housing which transitions between a collapsed orientation and an articulated orientation through one of slidable and rotatable motion of the first housing element relative to the second housing element. In one embodiment, the electronic device may comprise a mobile telephone or the like (although the invention is not limited thereto).

The grounding connector comprises a ground clip, a cam surface and a follower. The ground clip has a first region which is electrically coupled to a first housing element. Additionally, the ground clip includes a contact section selectably electrically coupled with a second housing element.

The cam surface is positioned on the first housing element and in proximity to the second region of the ground clip. The follower is slidably positionable on the second housing element. The follower has a first end that engages the cam surface and a second end that engages the second region of the ground clip. The ground clip is electrically coupled to a second housing element while the electronic device is in each of the collapsed orientation and the articulated orientation. Additionally, the cam surface is structurally configured so that upon movement between the collapsed orientation and the articulated orientation, the cam surface directs the second end of the follower to engage the second region of the ground clip and to electrically decouple the ground clip from a second housing element.

In accordance with at least one embodiment, the grounding connector further includes means for biasing the follower against the cam surface.

In accordance with at least one such embodiment, the biasing means further comprises a spring having a first end coupled to the first region and a second end coupled to the follower.

In accordance with another embodiment, the biasing means comprises an angled surface disposed on the second region of the ground clip.

In accordance with at least one embodiment, the first region of the ground clip further includes a channel formed thereon. The follower is structurally configured to slidably move along the channel. In one embodiment, the channel comprises a base, opposing side walls and tabs extending inwardly from each of the side walls and spaced apart from the base, to, in turn, constrain the follower to substantially linear movement. Preferably, the first region, the second region and the channel comprise a single integrally formed metal member.

In accordance with another embodiment, the ground clip comprises an elongated metal member which is folded over itself through a transition region and thereby defining the first and second regions. The transition region provides a biasing force to maintain engagement of the contact section of the ground clip with the second housing element.

In one embodiment, the second region includes a follower engagement region, which has an inclined area. The slope of the inclined area which defines the rate at which movement of the follower by the cam surface translates to movement of the contact section.

In another embodiment, the follower further includes a bearing positioned at the first end thereof. The bearing makes contact with the cam surface. In some embodiments, the bearing comprises a roller bearing.

In another embodiment, the cam surface comprises a substantially uniform arcuate configuration and two detent regions. A first detent region corresponds to the collapsed orientation and the second detent region corresponds to the articulated configuration. As the follower engages the substantially uniform arcuate configuration, electrical coupling of the contact section and the second housing element is precluded.

In another embodiment, the cam surface comprises a substantially linear configuration and two detent regions. A first detent region corresponds to the collapsed orientation and a second detent region corresponds to the articulated configuration. As the follower engages the substantially uniform arcuate configuration electrical coupling of the contact section and the second housing element is precluded.

In another aspect of the invention, the invention comprises an electronic device that includes a first housing element, a second housing element and a grounding connector. The first and second housing elements are moveable between a collapsed orientation and an articulated orientation through one of slidable and rotatable motion of a first housing element relative to a second housing element. The grounding connector includes the features set forth in the preferred embodiments set forth above.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1a, 1b, 2a and 2b, the grounding connector is shown generally at 16. The grounding connector is configured for use in association with a foldable electronic device shown in FIGS. 4a, 4b (slidable device) and FIGS. 5a through 5c (rotatable device) generally at 10. The foldable electronic device may comprise a wireless device, such as, for example a cellular telephone. Of course, the invention is not limited to such a device. The device 10 includes first housing element 12, second housing element 14, and grounding connector 16 (FIGS. 1a, 1b, 2a, 2b). It will be understood that the first housing element is rotated relative to the second housing element to direct the device between a closed orientation and a deployed orientation.

Figure 3A:
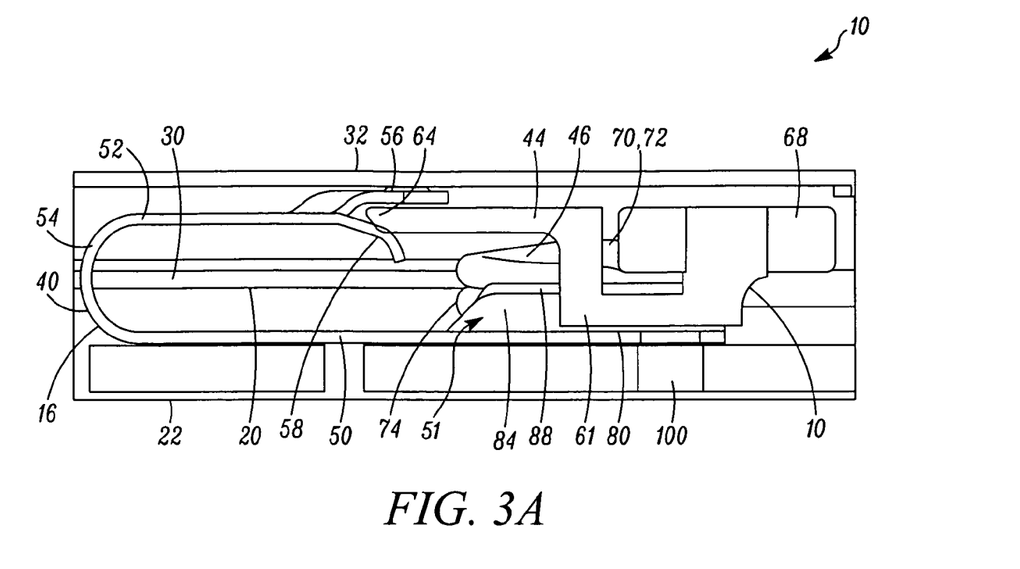
FIG. 3a of the drawings is a side elevational view of a grounding connector of the present invention, showing, in particular, the second end of the follower positioned in a detent of an arcuate cam surface.
Figure 3B:
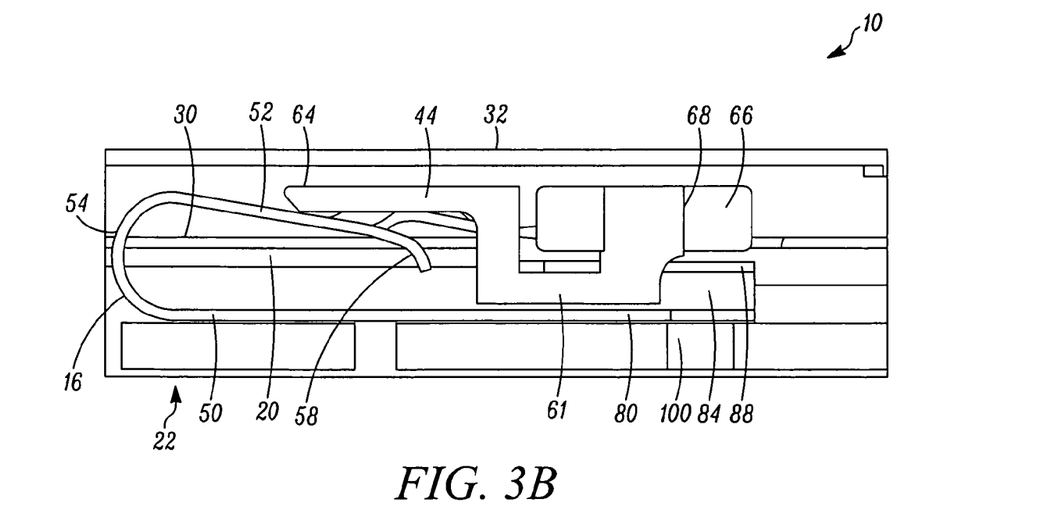
FIG. 3b of the drawings is a side elevational view of a grounding connector of the present invention, showing, in particular, the second end of the follower positioned along an arcuate cam surface.
Figure 4A:
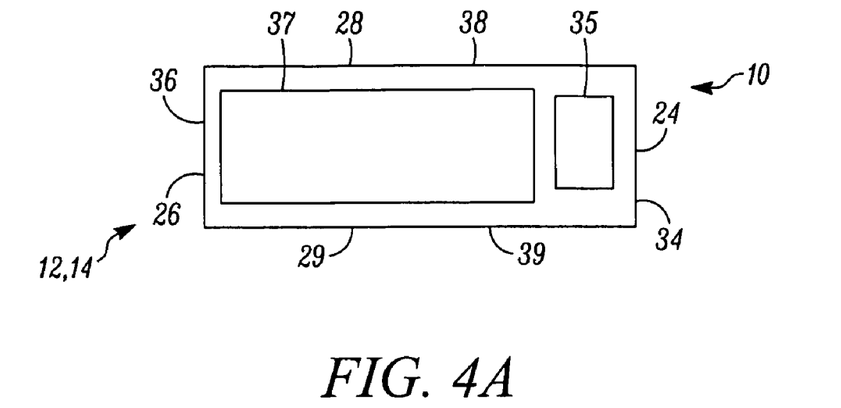
FIG. 4a comprises a top plan view of an electronic device in a collapsed orientation, wherein the first housing element and the second housing element slidably move relative to each other.
Figure 4B:
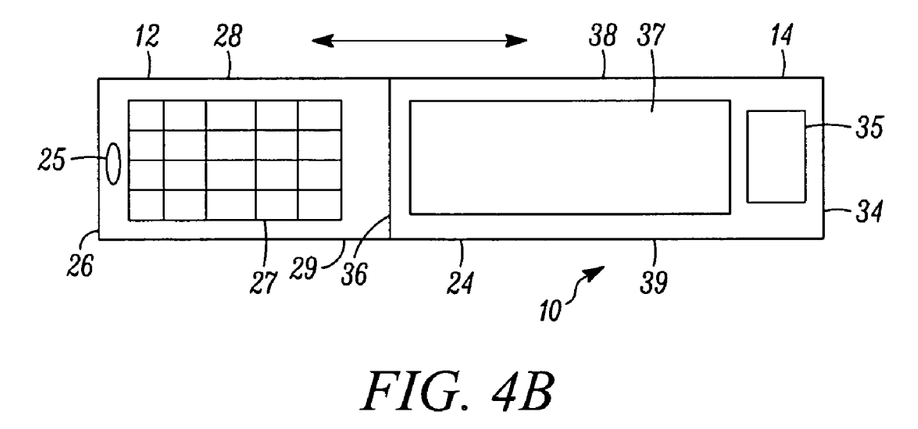
FIG. 4b comprises a top plan view of an electronic device in an articulated orientation, wherein the first housing element and the second housing element slidably move relative to each other.
Figure 5A:
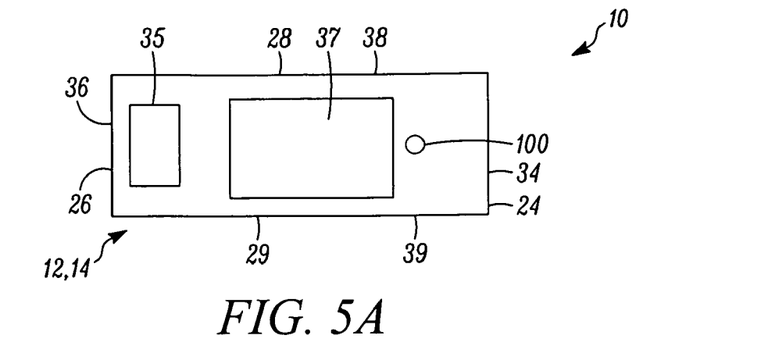
FIG. 5a comprises a top plan view of an electronic device in a collapsed orientation, wherein the first housing element and the second housing element rotatably move relative to each other.
Figure 5B:
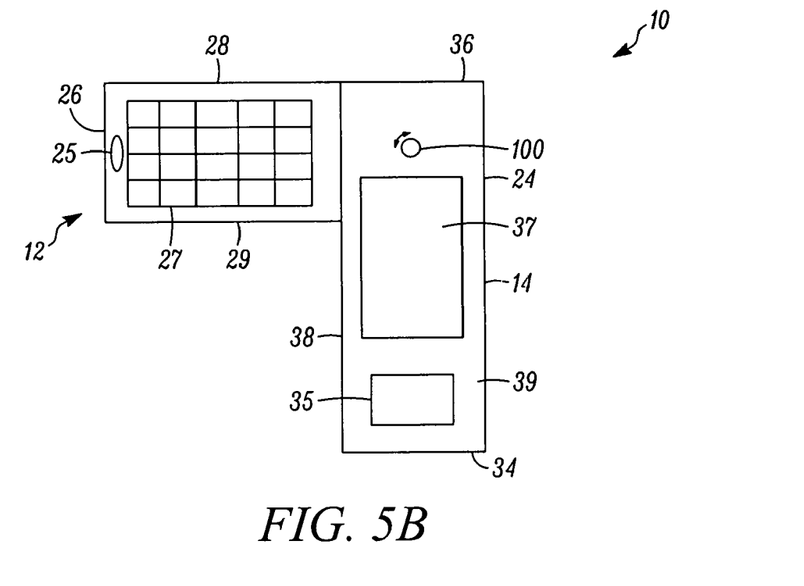
FIG. 5b comprises a top plan view of an electronic device in an orientation between the collapsed orientation and the articulated orientation, wherein the first housing element and the second housing element rotatably move relative to each other.
Figure 5C:
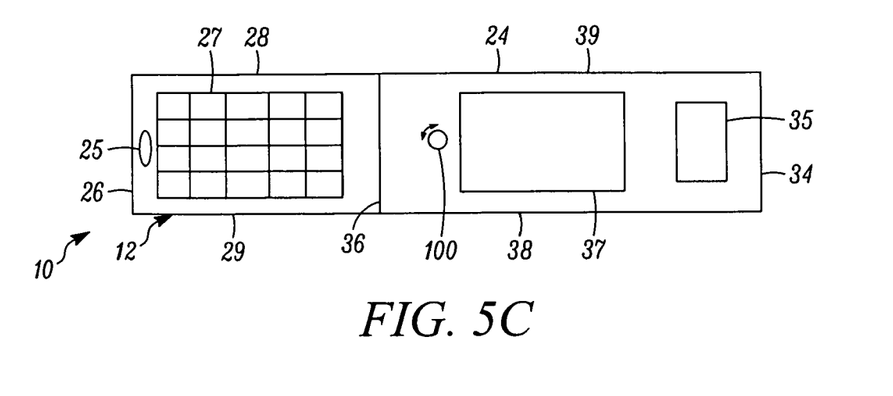
FIG. 5c comprises a top plan view of an electronic device in an articulated orientation, wherein the first housing element and the second housing element rotatably move relative to each other.

With reference to FIGS. 3 through 5, collectively, first housing element 12 includes inward surface 20, outward surface 22, proximal end 24, distal end 26 and opposing side edges 28, 29. Furthermore, first housing element includes microphone 25 and keyboard 27 on inward surface 20.

With continued reference to FIGS. 3 through 5, second housing element 14 includes inward surface 30, outward surface 32, proximal end 34, distal end 36 and opposing side edges 38, 39. In the embodiment shown, the second housing element 14 includes speaker 35 along with display 37.

In the embodiment of collective FIG. 5, it is contemplated that the first housing element can rotate about a transverse axis 100 which is substantially perpendicular to each of the first and second housing elements between a collapsed and articulated configuration. In turn, through rotation, the top surface of the second housing element becomes visible and accessible. In another embodiment, shown in collective FIG. 4, the first housing element and the second housing element can slide relative to each other so that when slid, elements of the second housing element become visible and accessible.

Additionally, each of the first housing element and the second housing element typically includes a plurality of electronic components. Although not shown, it will be understood that a plurality of wires may extend between the first housing element and the second housing element to connect the various electronic components to each other. Often times, such wires may be coupled together so as to resemble a ribbon formed from joined, parallel side by side wires. In other embodiments, such wires may correspond to traces on a flexible substrate or the like.

Figure 1A:
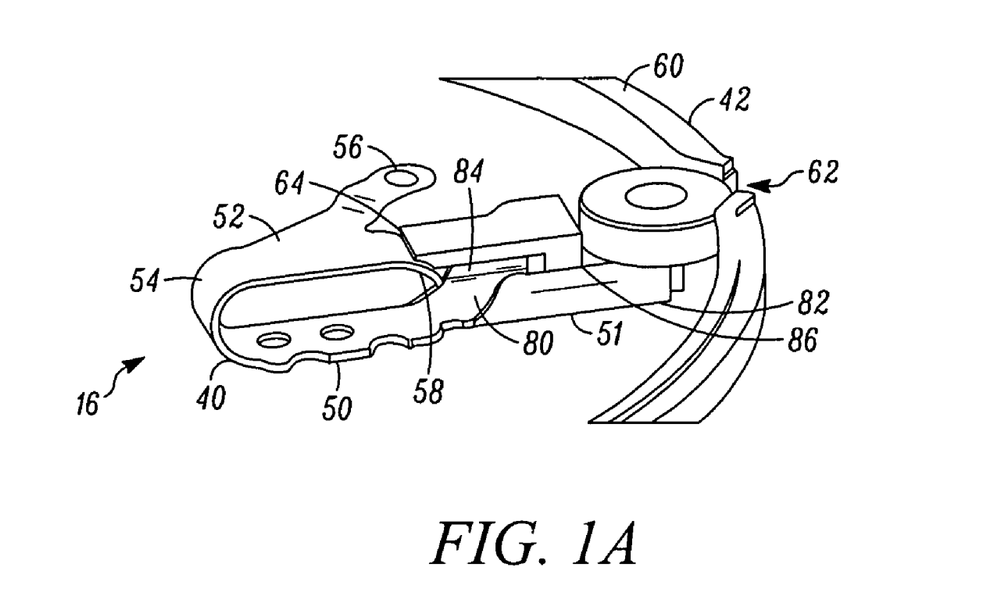
FIG. 1a of the drawings is a perspective view of a grounding connector of the present invention, showing, in particular, the second end of the follower positioned in a detent of an arcuate cam surface.
Figure 1B:
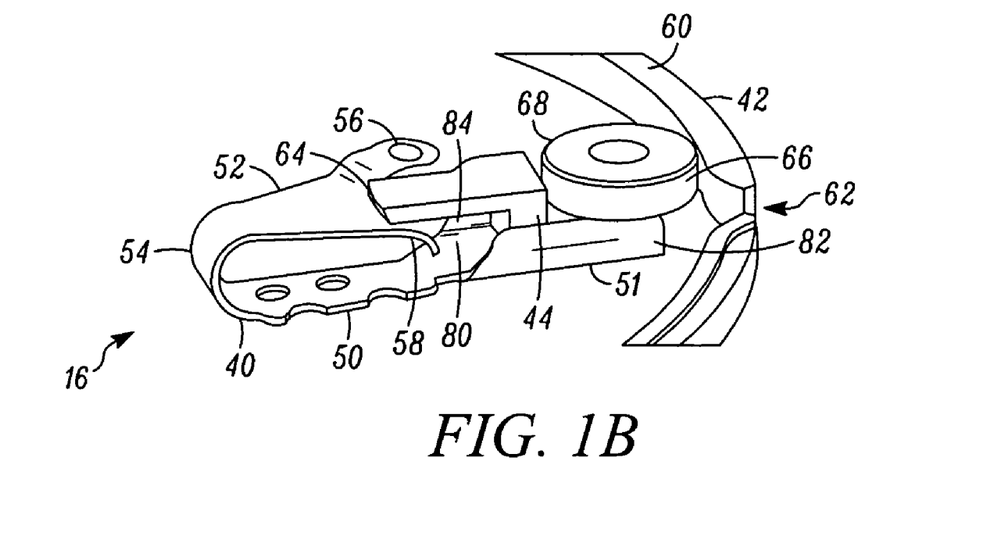
FIG. 1b of the drawings is a perspective view of a grounding connector of the present invention, showing, in particular, the second end of the follower positioned along an arcuate cam surface.
Figure 2A:
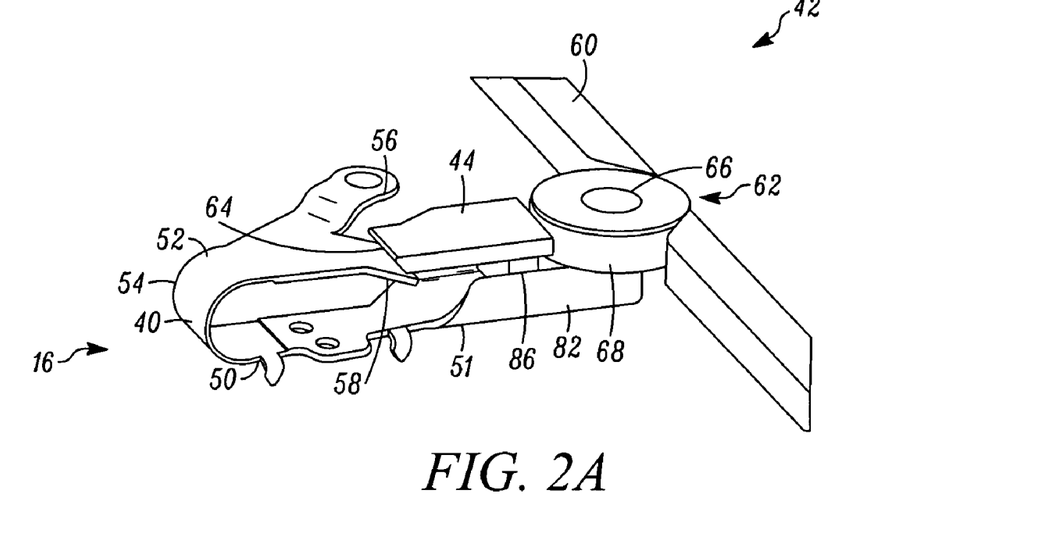
FIG. 2a of the drawings is a perspective view of a grounding connector of the present invention, showing, in particular, the second end of the follower positioned in a detent of an linear cam surface.
Figure 2B:
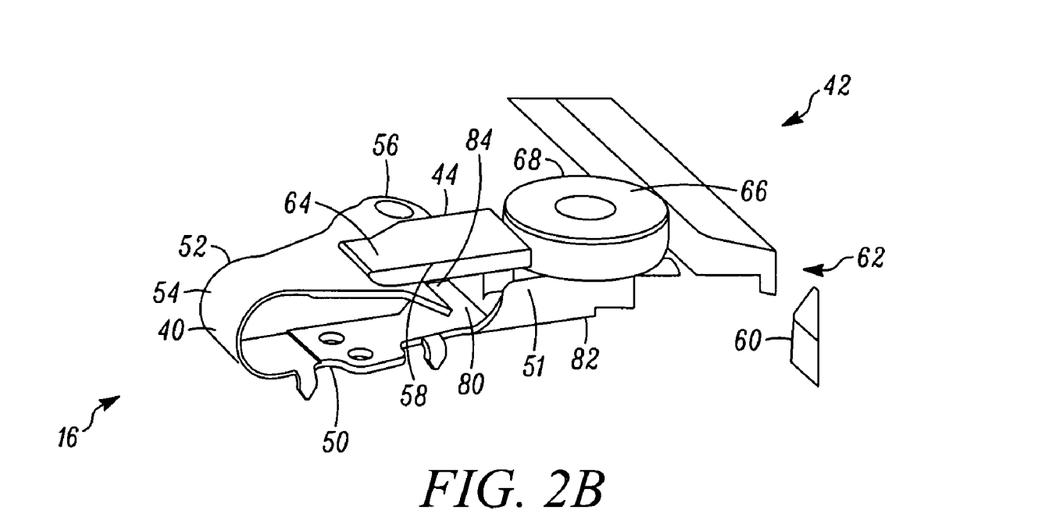
FIG. 2b of the drawings is a perspective view of a grounding connector of the present invention, showing, in particular, the second end of the follower positioned along an linear cam surface.

Grounding connector 16 is shown in collective FIGS. 1 through 3 as comprising ground clip 40, cam surface 42, follower 44 and biasing means 46. The ground clip 40 includes first region 50, second region 52 and transition region 54. The ground clip 40 preferably comprises a single integrated metal member which is folded over itself through the transition region 54 to form a substantially c-shaped configuration. The first region 50 is mounted to an electronic board on the first housing.

The first region 50 further includes channel 51 configured for the follower 44 to travel within. The channel 51 includes base 80, side walls 82, 84 and tabs 86, 88. The side walls 82, 84 extend from opposing sides of the base 80. The tabs 86, 88 extend inwardly from the upper end of the side walls. In turn, a c-channel is created by the base, walls and tabs so that the follower can be contained therewith and substantially limited to linear movement along the base.

The second region 52 of the ground clip 40 further includes a contact section 56 and follower engagement region 58. The contact section includes an upward protrusion (preferably coated or plated with a highly conductive and corrosion resistant metal, such as gold or copper). The contact section is configured to electrically engage a structure positioned on the second housing element, such as the electrical board of the second housing element.

The follower engagement region 58 comprises an inclined region (which may comprise a compound curved configuration). Specifically, the outermost portion of the follower engagement region is inclined at the greatest slope. Subsequent regions are of a lesser slope until the final region of the follower engagement region is substantially horizontal. The slope of the follower engagement region translates to the amount of vertical movement of the follower region in response to prompting of the follower. The greater the slope, the greater the movement vertically by the contact region from the second housing element. The construction shown in the preferred embodiment allows for an initial quick movement of the contact region away from the second housing element (to quickly electrically decouple the two components), then subsequent movement away from the second housing element occurs at a slower rate (and can be tuned to improve the user experience).

Indeed, the slope of the follower engagement region can be varied within the scope of the invention. In particular, the follower engagement region may comprise a single linear or uniformly arcuate configuration in certain embodiments. In other embodiments, a number of separate regions of different slope are contemplated. In still other embodiments, it is contemplated that the slope of the follower engagement region is such that the follower engagement region can impart a force against the follower to press the follower against the cam (in place of or in addition to the biasing means). In other words, the follower engagement region can have a slope wherein the follower engagement region itself forms the biasing means.

Follower 44 is shown in collective FIGS. 1 through 3 as comprising engagement portion 61, first end 64, second end 66 and bearing 68. The engagement portion 61 is configured so as to substantially match the cross-sectional configuration of the channel 51. In turn, the engagement portion 61 can slidably move within the c-channel defined by the channel 51. First end 64 comprises the portion that engages the follower engagement region. In the embodiment shown, the first end 64 includes a gentle sloped portion which facilitates engagement with the follower engagement region while minimizing binding and wear upon the two surfaces.

Second end 66 is configured to receive bearing 68 which comprises a roller surface that minimizes wear and binding when tracking along the cam surface 42. The roller surface is mounted upon an axle which extends substantially perpendicular to the direction of travel of the follower within the channel 51. In other embodiments, the second end 66 may comprise an engagement surface free of any bearing member, or a bearing member other than a roller wheel positioned upon an axle.

Biasing means 46 is shown in FIGS. 3a and 3b as comprising torsion spring 70. The torsion spring 70 includes first end 72 and second end 74. The first end 72 is coupled to the follower and the second end 74 is coupled to the first housing member (or to the ground clip) so that it remains stationary relative to movement of the follower 44. The torsion spring is configured such that the follower is biased against the cam surface 42. Thus, the torsion spring forces the follower toward the cam surface such that it can track the cam surface accurately. In other embodiments, different spring arrangements can be utilized, such as a compression spring, an extension spring or the like. In yet other embodiments, and as set forth above, the follower engagement region (and, in particular, the slope thereof) can function as the biasing means by directing the second end of the follower into the cam surface.

Cam surface 42 is shown in collective FIGS. 1 and 2 as comprising one of an arcuate configuration and a substantially linear configuration having detents positioned thereaalong. The cam surface is fixed to the second housing element (wherein the ground clip is fixedly coupled to the first housing element) and positioned in close proximity to the follower so that the second end of the follower can be placed in contact therewith. In particular, with respect to the cam surface 42 of collective FIG. 2, the cam surface 42 comprises a substantially arcuate configuration which is centered about the same axis of rotation as the first and second housing elements relative to each other. The cam surface 42 includes a detent at a point at which the follower is positioned when the first and second housing elements are in the collapsed orientation. In such an orientation, it is desired that the follower be in a position such that the contact section of the ground clip engages the second housing element.

Similarly, the cam surface 42 includes another detent at a point at which the follower is positioned when the first and second housing elements are in the deployed orientation. In such an orientation it is likewise desired that the follower be in a position such that the contact section of the ground clip engages the second housing element. It will be understood that at any point along the cam surface other than the detents (i.e., when the two housing elements are in a position other than the collapsed and deployed orientations, such as any point therebetween), the follower pushes against the ground clip, disengaging the contact section from the second housing element.

In the embodiment shown in collective FIG. 2, the cam surface is substantially linear. Such a cam surface would be suitable for use in association with a slider type phone wherein the first housing element slidably moves relative to the second housing element. In such an embodiment, a first detent is positioned such that the second end of the follower rests within the detent when the first and second housing elements are in the collapsed orientation. The second detent is positioned such that the second end of the follower rests within the detent when the first and second housing elements are in the deployed orientation. At any point between the deployed and collapsed orientations, the follower engages the cam surface between the detents and, the cam surface directs the follower against the ground clip, which, in turn, separates the contact section from the second housing element.

In operation, the electronic device 10 initiates in, for example, a collapsed orientation. In such an orientation, the follower rests within the channel 51 of the ground clip 40. The second end of the follower 66, and in particular, bearing 68 is positioned within a detent of the cam surface 42. In such a position, the first end of the follower does not impart movement on the second region of the ground clip sufficient to separate the contact section 56 from the second housing element. As such, the contact section 56 is in electronic communication with the second housing element.

As the user begins to deploy the electronic device by rotating the first housing element relative to the second housing element, the follower 66 is moved along the cam surface 42 out of the detent (in the embodiment of collective FIG. 5). In turn, the follower linearly moves within the channel 51 and forces first end 64 thereof against the second region 52. The movement of the second region 52 due to the force of the follower 44 electrically decouples the contact section 56 from the second housing element. The follower 44 remains in such an orientation as the housings continue to rotate relative to each other.

Through continued relative rotational movement, the two housing elements eventually reach a deployed orientation. As the deployed orientation is reached, the second end of the follower reaches and engages the second detent. At such time, the follower retreats from the second region 52 of the ground clip 40. In turn, the ground clip moves in an upward direction (due to the resilience of the ground clip and the biasing effect of the second region and the transition region). Eventually, the contact section 56 engages the second housing element, reestablishing an electrical coupling between the contact section 56 (and, in turn; the first housing element) and the second housing element. The biasing means 46 insures that the second end of the follower (and, in this embodiment, the bearing 68) remains in steady contact with the cam surface.

Similarly, as the user returns the electrical device from a deployed orientation to a collapsed orientation, the cam surface rotationally moves relative to the follower. The follower is prompted from detent, at which time the first end of the follower exerts a force against the second region of the ground clip. This force, in turn, disengages the contact section from the second housing element. Continued rotation of the two housing elements directs the follower against the cam surface between the detents. Eventually, as the collapsed orientation is approached, the follower is exposed to the detent. At such time, the second end of the follower enters the detent, thereby linearly moving the follower within channel 51 in a direction away from the second region of the ground clip. Such linear movement of the follower releases the force the follower exerts against the second region of the ground clip. As a result, the ground clip returns to its initial configuration, and the contact section 56 reengages the second housing element, reestablishing electrical coupling between the first and second housing elements. Again, the biasing means insures that the follower tracks the cam surface throughout the movement of the first and second housing members relative to each other.

In the embodiment shown in collective FIG. 4, the function of the components is substantially similar. However, in such an embodiment the movement of the two housing members is a sliding motion between the deployed and collapsed orientations. In the collapsed orientation, the two housing members overlie each other. One of the two housing members is slid relative to the other of the two housing members to deploy the electrical device (as opposed to rotational movement in the embodiment shown in FIG. 1). In such an embodiment, the motion between the two housing members is substantially linear. In turn, the cam surface of such an embodiment is substantially linear, instead of arcuate. A first detent is positioned at a location corresponding to a follower position in the collapsed orientation. A second detent is positioned at a location corresponding to a follower position in the deployed orientation. Thus, in each of these two orientations, the follower remains in such a position that the contact section 56 of the ground clip engages the second housing member. In an orientation between the deployed and collapsed orientations, the cam surface is configured such that the follower contacts the second ground clip 40 to decouple (i.e., preclude coupling of) contact section 56 from the second housing member.

It will be understood that in either embodiment, the cam surface can be varied while remaining within the scope of the invention. For example, the movement of the follower can be varied between the deployed and collapsed orientations while still facilitating the electrical decoupling of the contact section and the second housing member from each other. Additionally, while it is shown that the ground clip 40 is fixed to the first housing element and selectively placeable in coupling engagement with the second housing member, it is contemplated that the ground clip can be fixed to the second housing element and selectively placeable in coupling engagement with the first housing element. In such an embodiment, the cam surface will likewise be fixed to the first housing element.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A grounding connector for an electronic device having a first housing and a second housing, the electronic device transitioning between a collapsed orientation and an articulated orientation through one of slidable and rotatable motion of the first housing element relative to the second housing element, the grounding connector comprising:
    a ground clip having
        a first region electrically coupled to a first housing element; and
        a second region including a contact section selectably electrically coupled with a second housing element;
    a cam surface on one of a first and second housing elements, positioned in proximity to the second region of the ground clip; and
    a follower slidably positionable on the other of a first and second housing element to which the cam surface is attached, the follower having a first end that engages the cam surface and a second end that engages the second region of the ground clip,
    wherein, the ground clip is electrically coupled to a second housing element while the electronic device is in each of the collapsed orientation and the articulated orientation, and
    wherein the cam surface is structurally configured so that upon movement between the collapsed orientation and the articulated orientation, the cam surface directs the second end of the follower to engage the second region of the ground clip and to electrically decouple the ground clip from a second housing element.

2. The grounding connector of claim 1 further including means for biasing the follower against the cam surface.

3. The grounding connector of claim 2 wherein the biasing means further comprises a spring having a first end coupled to the first region and a second end coupled to the follower.

4. The grounding connector of claim 2 wherein the biasing means comprises an angled surface disposed on the second region of the ground clip.

5. The grounding connector of claim 1 wherein the first region of the ground clip further includes a channel formed thereon wherein the follower is structurally configured to slidably move along the channel.

6. The grounding connector of claim 5 wherein the channel comprises a base, opposing side walls and tabs extending inwardly from each of the opposing side walls and spaced apart from the base, to, in turn, constrain the follower to substantially linear movement.

7. The grounding connector of claim 5 wherein the first region, the second region and the channel comprise a single integrally formed metal member.

8. The grounding connector of claim 1 wherein the ground clip comprises an elongated metal member which is folded over itself through a transition region, thereby defining the first and second regions, the transition region providing a biasing force to maintain engagement of the contact section of the ground clip with the second housing element.

9. The grounding connector of claim 1 wherein the second region includes a follower engagement region, the follower engagement region having an inclined area, a slope of which defines a rate at which movement of the follower by the cam surface translates to movement of the contact section.

10. The grounding connector of claim 1 wherein the follower further includes a bearing positioned at the first end thereof, the bearing contacting the cam surface.

11. The grounding connector of claim 1 wherein the bearing comprises a roller bearing.

12. The grounding connector of claim 1 wherein the cam surface comprises a substantially uniform arcuate configuration and two detent regions, a first detent region corresponding to the collapsed orientation and the second detent region corresponding to the articulated configuration, wherein as the follower engages the substantially uniform arcuate configuration electrical coupling of the contact section and the second housing element is precluded.

13. The grounding connector of claim 1 wherein the cam surface comprises a substantially linear configuration and two detent regions, a first detent region corresponding to the collapsed orientation and a second detent region corresponding to the articulated configuration, wherein as the follower engages the substantially uniform arcuate configuration electrical coupling of the contact section and the second housing element is precluded.

14. An electronic device comprising:
a first housing element and a second housing element, the first and second housing elements moveable between a collapsed orientation to an articulated orientation through one of slidable and rotatable motion of a first housing element relative to a second housing element; and
a grounding connector grounding the first housing element to the second housing element, the grounding connector comprising:
a ground clip having
a first region electrically coupled to the first housing element; and
a second region including a contact section selectably electrically coupled with the second housing element;
a cam surface on one of the first and second housing elements, positioned in proximity to the second region of the ground clip; and
a follower slidably positionable on the other of the first and second housing element to which a cam is attached, the follower having a first end that engages the cam surface and a second end that engages the second region of the ground clip,
wherein, the ground clip is electrically coupled to the second housing element while the electronic device is in each of the collapsed orientation and the articulated orientation, and
wherein the cam surface is structurally configured so that upon movement between the collapsed orientation and the articulated orientation, the cam surface directs the second end of the follower to engage the second region of the ground clip and to electrically decouple the ground clip from the second housing element.

15. The electronic device of claim 14 further including means for biasing the follower against the cam surface.

16. The electronic device of claim 14 wherein the first region of the ground clip further includes a channel formed thereon wherein the follower is structurally configured to slidably move along the channel.

17. The electronic device of claim 14 wherein the ground clip comprises an elongated metal member which is folded over itself through a transition region, thereby defining the first and second regions, the transition region providing a biasing force to maintain engagement of the contact section of the ground clip with the second housing element.

18. The electronic device of claim 14 wherein the second region includes a follower engagement region, the follower engagement region having an inclined area, a slope of which defines a rate at which movement of the follower by the cam surface translates to movement of the contact section.

19. The electronic device of claim 14 wherein the cam surface comprises a substantially uniform arcuate configuration and two detent regions, a first detent region corresponding to the collapsed orientation and a second detent region corresponding to the articulated configuration, wherein as the follower engages the substantially uniform arcuate configuration electrical coupling of the contact section and the second housing element is precluded.

20. The electronic device of claim 14 wherein the cam surface comprises a substantially linear configuration and two detent regions, a first detent region corresponding to the collapsed orientation and a second detent region corresponding to the articulated configuration, wherein as the follower engages the substantially uniform arcuate configuration electrical coupling of the contact section and the second housing element is precluded.

* * * * *